(12) United States Patent
Cole

(10) Patent No.: US 7,188,108 B2
(45) Date of Patent: *Mar. 6, 2007

(54) METHOD AND APPARATUS FOR OBTAINING STORAGE INFORMATION FROM A TRANSACTION LOG

(75) Inventor: Ray Cole, Pflugerville, TX (US)

(73) Assignee: BMC Software, Inc., Houston, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/658,852

(22) Filed: Sep. 10, 2003

(65) Prior Publication Data

US 2004/0049507 A1    Mar. 11, 2004

Related U.S. Application Data

(63) Continuation of application No. 10/147,573, filed on May 16, 2002, now abandoned, which is a continuation of application No. 09/183,521, filed on Oct. 30, 1998, now Pat. No. 6,418,437.

(51) Int. Cl.
*G06F 17/30* (2006.01)
(52) U.S. Cl. .................. 707/8; 707/2; 707/4; 707/3; 707/205; 707/206; 707/200
(58) Field of Classification Search .............. 707/2–4, 707/8, 200, 10, 101, 202, 205, 206
See application file for complete search history.

(56) References Cited

U.S. PATENT DOCUMENTS

| 5,072,367 | A | * | 12/1991 | Clayton et al. ............... 707/3 |
| 5,812,849 | A | * | 9/1998 | Nykiel et al. ............... 717/101 |
| 5,870,758 | A | * | 2/1999 | Bamford et al. ............ 707/201 |
| 5,966,709 | A | * | 10/1999 | Zhang et al. ............... 707/101 |
| 6,058,389 | A | * | 5/2000 | Chandra et al. ............... 707/1 |
| 6,092,083 | A | * | 7/2000 | Brodersen et al. .......... 707/201 |
| 6,122,640 | A | * | 9/2000 | Pereira ................... 707/103 R |
| 6,192,365 | B1 | * | 2/2001 | Draper et al. ............... 707/101 |

* cited by examiner

*Primary Examiner*—Cam-Y Truong
(74) *Attorney, Agent, or Firm*—Vinson & Elkins L.L.P.

(57) ABSTRACT

Initially, a table in the database is baselined. The baselining function is usually built into the database system program which manages the database itself. This baselining procedure generates storage information like the number of rows in the table, the average length of a row, the number of chained/migrated rows, and the average free space per page in the table. This storage information is transferred to a monitoring routine via a transaction log. The monitoring routine accepts the storage information for the table. Next, the monitoring routine monitors the transaction log for entries which alter the storage information initially passed to it. At some point, an entity may wish to know the current storage information for the table. When this occurs, a message is passed to the monitoring routine, and the monitoring routine transfers the storage information to the requesting entity, without accessing the database.

9 Claims, 4 Drawing Sheets

METHOD AND APPARATUS FOR OBTAINING STORAGE INFORMATION FROM A TRANSACTION LOG

This application is a continuation of application Ser. No. 10/147,573 filed May 16, 2002 now abandoned, which is a continuation of application Ser. No. 09/183,521 filed Oct. 30, 1998 now U.S. Pat. No. 6,418,437.

BACKGROUND OF THE INVENTION

1. Technical Field

The present invention relates generally to database programs implemented on computer systems. Specifically, the present invention utilizes a transaction log related to a database to calculate values that are useful when performing a storage analysis of the database.

2. Description of the Related Art

Large electronic databases have become common-place items on many of today's large computer systems. These electronic databases, and the database management programs which manipulate and make accessible the data in the database, allow vast amounts of information to be stored in an orderly, easily retrievable manner. Most large corporations heavily rely on the information contained in these electronic databases.

Maintaining these databases is important to ensure their proper operation. Various utilities have been developed to arrange the data items in the database to increase the speed at which they can be retrieved and to decrease the amount of space occupied by the database.

Information relating to how the data in the database is stored must be gathered before any maintenance procedures can be initiated. Traditionally, this data was gathered by simply accessing the database. However, this method has a number of disadvantages. The most important drawback to gathering storage information in this manner is that while the storage information is being gathered from the database, users are unable to modify the database. For a large database, the time required to access the database can be several minutes, and locking users out of the database for this amount of time can be unacceptable.

However, other sources of information about the database often exist in the form of transaction logs. Many database management programs maintain a record of the changes that are made to the database in structures known as transaction logs. The information describing the changes made to a database is often known as transaction log data. This log data can be kept in files or other virtual storage devices. Because all of the changes made to a database over a certain period of time are recorded in a transaction log, these transaction logs can be accessed to retrieve a variety of information about the database without having to access the database itself.

Although transaction logs contain data which can be very useful, tools which make use of this data are few in number. Thus, a method which utilizes transaction log data to extract storage information about the database itself would be useful. Such a method would examine the transaction log data and compute values for the database such as the block count, the number of rows, the average length of a row, the number of chained and unchained rows, and so on. Obtaining this information should minimize access to the database itself, and, instead, should utilize the transaction log for the database.

SUMMARY OF THE INVENTION

Therefore, it is one object of the present invention to obtain storage information for the database while minimizing access to the database itself.

It is yet another object of the present invention to utilize the information in the transaction log to compute these statistics.

It is still another object of the present invention to continually update the statistics by monitoring the information added to the transaction log.

When characterized as a method, the present invention achieves these and other objects as follows. Initially, a table in the database is baselined. The baselining function is usually built into the database system program which manages the database itself. This baselining procedure generates storage information like the number of rows in the table, the average length of a row, the number of chained/migrated rows, and the average free space per page in the table. This storage information is transferred to a monitoring routine via a transaction log. The monitoring routine accepts the storage information for the table. Next, the monitoring routine monitors the transaction log for entries which alter the storage information initially passed to it. At some point, an entity may wish to know the current storage information for the table. When this occurs, a message is passed to the monitoring routine, and the monitoring routine transfers the storage information to the requesting entity, without accessing the database. The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
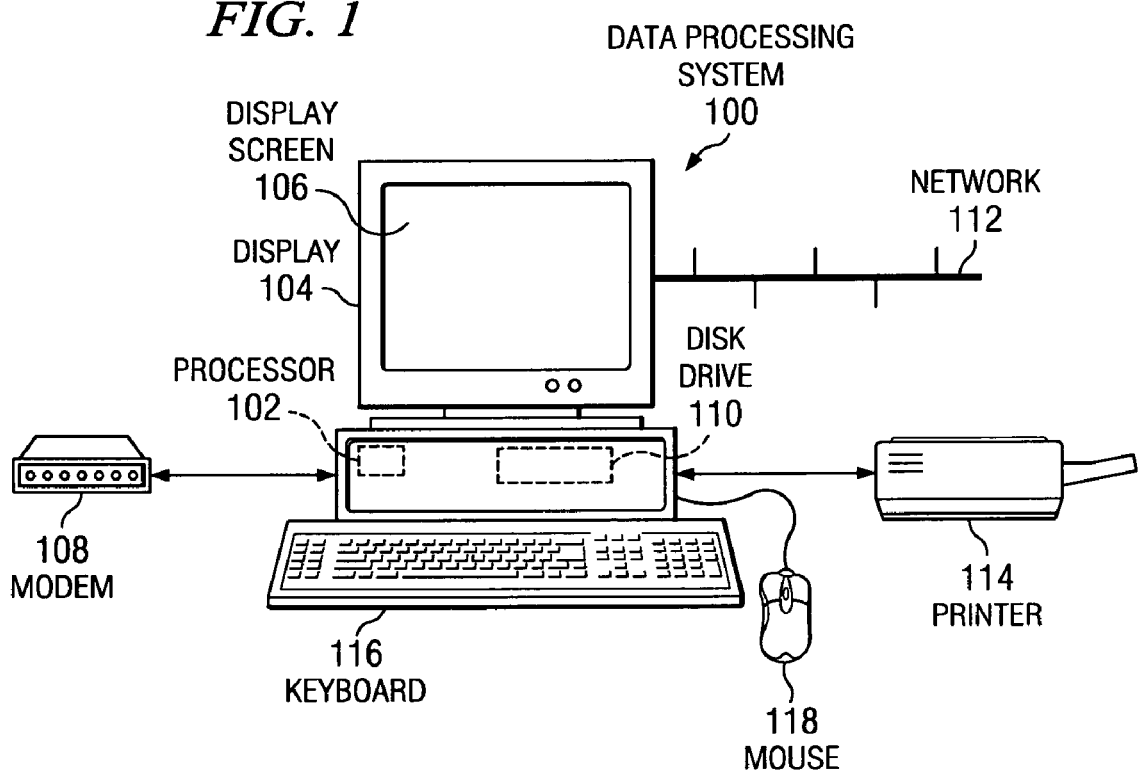
FIG. 1 depicts a general purpose computer system upon which the present invention can be implemented.

FIG. 1 depicts data processing system 100, which includes processor 102 and display 104. Display 104 includes display screen 106, which may be implemented utilizing a cathode ray tube (CRT), a liquid crystal display (LCD), an electroluminescent panel, or the like. Data can be entered into data processing system 100 by means of a mouse 118 or keyboard 116. In addition to mouse 118 and keyboard 116, data can be entered using a track ball, joystick, touch sensitive tablet or screen, trackpad, or glidepad. Mouse 118 may be utilized to move a pointer or cursor on display screen 106. Processor 102 may also be coupled to one or more peripheral devices, such as modem 108 or disk drive 110, each of which may be internal or external to the enclosure of processor 102. Data processing system 100 may also be connected to network 112 in order to communicate with other computer units. Network 112 may be a local intranet (e.g., a LAN or WAN), or the network of computers known as the Internet, or both. An output device such a printer 114 may also be coupled to processor 102.

Those persons skilled in the art of computer system design should recognize that display 104, keyboard 116, and the pointing device 118 may each be implemented utilizing any one of several known off-the-shelf components. Data processing system 100 may be implemented utilizing any general purpose computer or so-called "personal computer," "workstation," or "server," such as those sold by Compaq, Dell, Sun, IBM and others.

Figure 2:
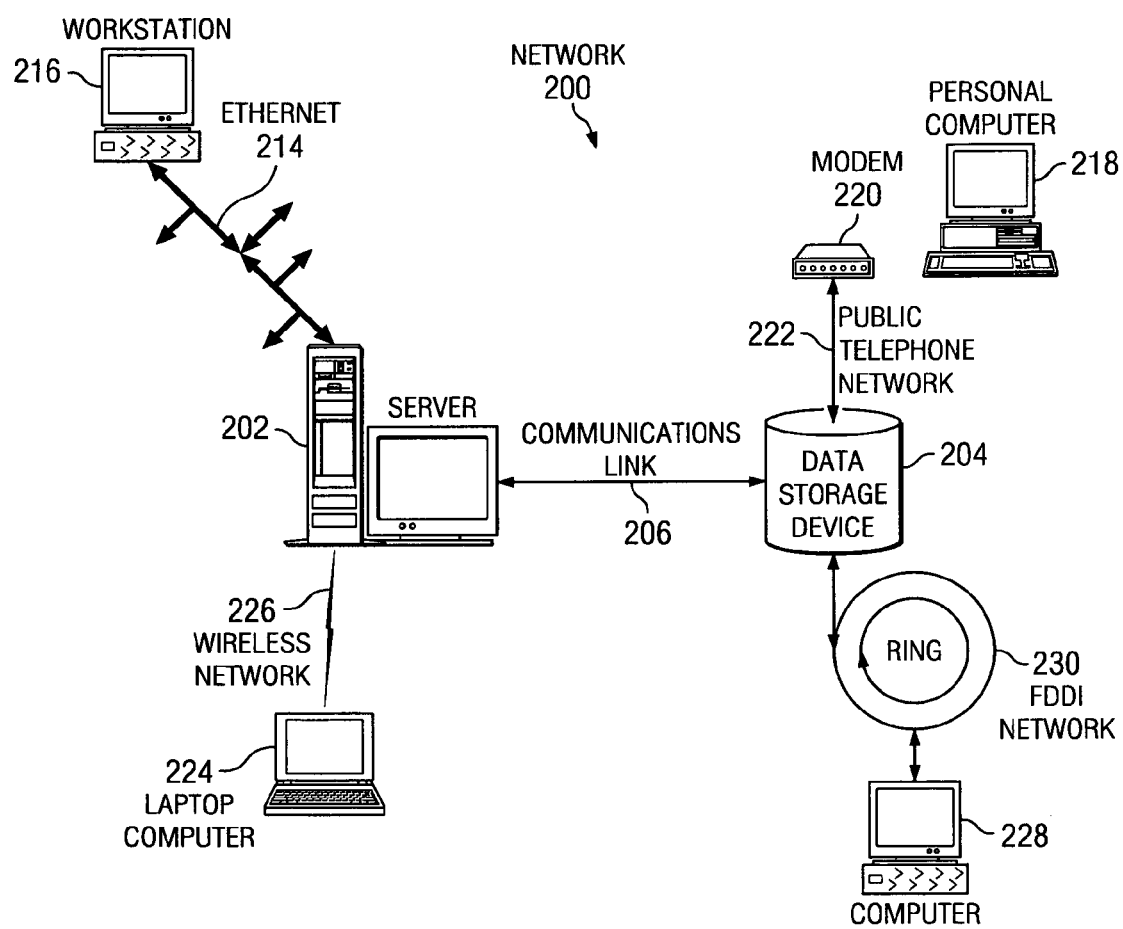
FIG. 2 illustrates a computer network upon which the present invention can be implemented.

FIG. 2 illustrates a computer network according to the present invention. Central to network 200 is server 202 and data storage device 204. Server 202 is connected to data storage device 204 via communications link 206. Server 202 and data storage device 204 operate to store and process data for the computing devices connected to network 200. Workstation 216 is connected to server 202 via Ethernet 214. This connection can be accomplished in many ways, as known in the art. Not shown in FIG. 2 are the bridges, routers, multiplexers, and other intermediate devices which are commonly found in an Ethernet network. In other embodiments, Ethernet network 214 could be comprised of an ATM network. ATM networks generally have the ability to transfer more data than comparable Ethernet type networks.

Personal computer 218 is connected to server 202 using modem 220. Modem 220 allows personal computer 218 to send and receive digital signals over public telephone network 222. Using a modem allows users to access server 202 when they do not have access to a network connection. However, sending and receiving data using a modem is generally slower than sending and receiving data over a network such as Ethernet network 214.

Laptop computer 224 is connected to server 202 via wireless network 226. This type of connection can be used by persons operating in the field. Wireless network 226 can be implemented using satellites, cellular technology, Packet technology, or other generally available wireless communication protocols.

Computer 228 is connected to server 202 via FDDI network 230. FDDI network 230 is usually implemented with a fiber optic cable. Generally, fiber optic cables have a much greater bandwidth than traditional copper transmission lines.

Figure 3:
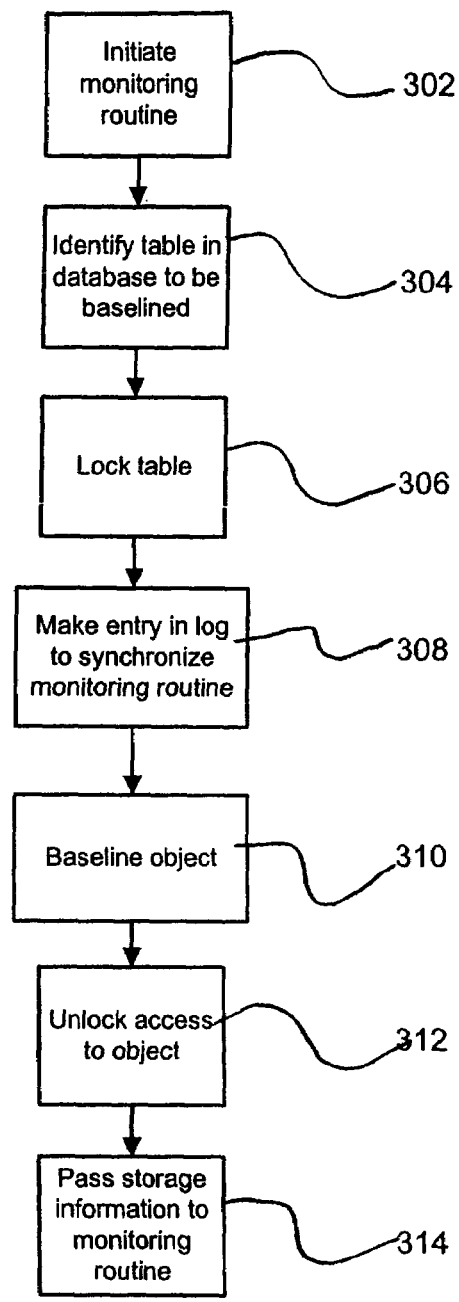
FIG. 3 is a flowchart which illustrates a portion of the process according to the present invention.
Figure 4:
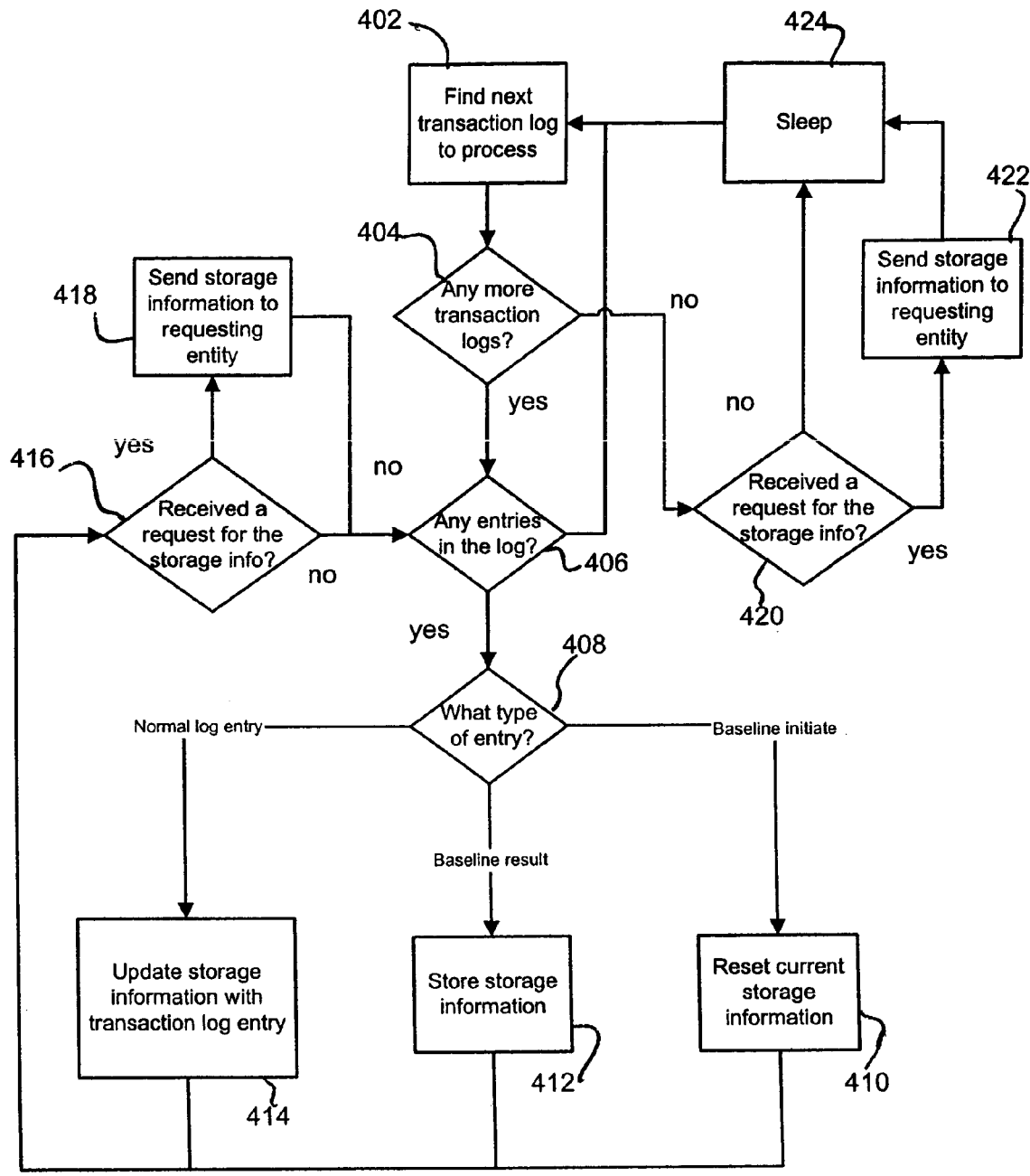
FIG. 4 is a flowchart which further illustrates the process according to the present invention.

FIGS. 3 and 4 illustrate a process for gathering storage information for a database by utilizing a transaction log. This process can be implemented using the data processing systems and servers shown in FIGS. 1 and 2. Generally, the process which comprises the present invention finds use with database management systems such as those sold by Sybase, Microsoft, Oracle, Informix, and others. These database management systems maintain transaction logs which detail changes made to the actual database. For example, these transaction logs contain entries that note the change of a particular piece of data, the insertion, deletion, or movement of a row, and the splitting of pages in the database. As used herein, the term "transaction log" refers to both a single transaction log or a set of transaction logs (sometimes referred to as a transaction log set).

The process according to the present invention begins by baselining a table in the database. As used herein, the term "table" includes any objects contained in a database which are similar to tables and which can be used to store information for a series of objects. The baselining procedure examines the table in the database itself to determine the number of blocks in the table, the number of rows in the table, the average length of a row, the number of chained and migrated rows, and the average free space per page (hereinafter referred to as the "storage information"). Other values can be gathered and/or computed and included with this storage information. After the baselining procedure completes, the process according to the present invention monitors the transaction log to keep the storage information updated. By continuously monitoring the transaction log, the baselining procedure only needs to be performed one time. Also, a user can select more than one table to be analyzed and monitored.

The baselining process begins by initiating the monitoring routine, which will be described in detail below (302). Next, a table in the database is identified and locked (304, 306). Locking a table prevents users from modifying the table. Locking a table is disfavored, as it interrupts the normal functioning of the database system as a whole. However, the table has to be locked only once during the process (as long as all of the entries to the transaction log are monitored). Afterwards, an entry designed to be recognized by the monitoring routine is made in the transaction log (308). Communicating with the monitoring routine via the transaction log is possible since the monitoring routine continuously monitors the transaction log. When the monitoring routine recognizes the coded entry, it resets all of the storage space allocated to the table about to be baselined and prepares to receive the storage information that will be generated from the baselining procedure. The monitoring routine also begins to process any entries made to the transaction log which describe changes or other events involving the table being baselined. The monitoring routine begins processing the information at this time, as opposed to when the storage information is actually retrieved, because there exists a window between the point when the table is unlocked and when the storage information is actually sent to the monitoring routine. Next, the table is baselined (310). All of the popular commercial database program have built-in functions that can compute the storage information for a table or that can return the data necessary to derive the storage information. After the baselining procedure is complete, the table is unlocked (312). This allows users and other programs to access and modify the table in a normal manner. Next, storage information for a table is computed and sent to the monitoring routine via the transaction log (314). This information provides the monitoring routine with a basis from which to calculate changes to the table. The monitoring routine also processes any entries to the transaction log which describe a change or other event involving the table which occurred after the table was unlocked, but before the storage information was received.

The number of blocks in the table, the number of rows, and the average row length are returned directly from the baseline procedure. However, some database systems do not directly return the number of chained and migrated rows. For example, the Oracle database system returns the identities of the chained and migrated rows, without distinguishing the two. The present invention stores the row identifications (row IDs) of the rows which are either chained or migrated. When called upon by an application, the monitoring routine sends these row IDs to the application for further processing to determine which rows are chained and which ones are migrated.

At this point, access of the database ends and the monitoring routine begins to update the storage information by monitoring entries made in the transaction log. Specifically, the monitoring routine monitors the transaction log to determine: when a row is added, deleted, or updated, when a row becomes chained or unchained, when a row is updated to a new length, or when data blocks are allocated. When the monitoring routine detects one of these events, it updates the storage information accordingly. Also, the identification of newly chained rows is stored, along with the identification of chained rows that are deleted. The monitoring routine keeps gathering information related to the storage information as long as it continues to execute.

The monitoring routine first selects a transaction log to process (402). Next, the monitoring routine checks to make sure there are still transaction logs to process (404). If there are logs to process, the monitoring routine selects a new entry in the log (406), and determines the type of the entry (408). If the entry is a message that the database is about to be baselined, the monitoring routine resets the values it has for the current storage information and continues to process entries for the table (410). If the entry contains new storage information generated from the baselining procedure, it will store the storage information and begin updating the storage information with the entries that are placed in the transaction log (412). If the entry is a normal transaction log entry, the monitoring routine processes the entry and updates the storage information accordingly (414). In a preferred embodiment of the present invention, the updates that have to be made to the storage information and the other data stored by the monitoring routine are initially stored in RAM then written to a disk sometime later. After the entry in the transaction log is processed, the monitoring routine checks to see if a request for the storage information has been received (416). In a preferred embodiment of the present invention, this check is performed each time 400 records are processed. However, the present invention can check for the receipt of a request based upon almost any condition. If a request for the storage information has been received, the storage information is sent to the requesting entity (418). After the storage information is sent to the requesting entity, or if no request for the storage information is received, processing continues at step 406.

When there are no more entries in the transaction log being processed, another transaction log is retrieved to be processed (406, 402). When the last entry in the last transaction log is processed, the monitoring routine checks to see if a request for the storage information has been received (420). If a request has been received, the storage information is provided to the requesting entity (422). If no request has been received, the monitoring routine goes to sleep for some period of time (424). In a preferred embodiment of the present invention, this sleep period lasts approximately four seconds.

At some point, an entity, such as an application program, will direct the monitoring routine to provide it with the current storage information and the row IDs of the chained/migrated rows for a table. In a preferred embodiment of the present invention, the monitoring routine will remove the row IDs from its own storage once it has forwarded them to an application program and the application program has confirmed the receipt of the row IDs. The monitoring routine takes this action on the assumption that the application program will store the row IDs it receives from the monitoring routine in its own memory. Ultimately, the application program will present the information it receives from the monitoring routine to a user so they can perform a storage analysis on the database. Since the storage information has been continuously updated by the monitoring routine, the user is presented with storage information that is up-to-date.

Also, the retrieval of this storage information is very fast, as the storage information is simply recalled from the monitoring routine, as opposed to having to be determined from accessing the database at the time it is requested.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms, which include (as shown in FIG. 2), but are not limited to: (a) information permanently stored on non-writable storage media (e.g. read only memory devices within a computer such as ROMs or CD-ROM disks readable only by a computer I/O attachment); (b) information alterably stored on writable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

The invention claimed is:

1. A computer-readable storage medium storing software executable by a computer system and designed to obtain and maintain storage information related to storage characteristics of a table in a database, the software comprising instructions for:

locking a table, thereby preventing modifications of the table;

making a first entry into a transaction log that the table is to be baselined;

baselining the table, wherein the storage information comprising average row length of the rows in the table and average free space in the table is obtained;

unlocking the table after it is baselined, wherein access to the table is restored;

preparing a storage area to receive the storage information for the table;

making a second entry into the transaction log, wherein the second entry contains the storage information;

retrieving the storage information from the transaction log; and periodically updating the storage information by monitoring subsequent entries in the transaction log.

2. The computer-readable storage medium of claim 1, wherein the stored software further comprises instructions for:

sending the storage information to a requesting entity, wherein a portion of the storage information is row identifications; and deleting the row identifications, wherein the requesting entity maintains the row identifications.

3. The computer-readable storage medium of claim 2, wherein the stored software further comprises instructions for periodically updating the storage information by adding row identifications to the storage information when a third entry in the transaction log indicates a new chained row, and removing row identifications from the storage information when a fourth entry indicates a chained row has been removed.

4. The computer-readable storage medium of claim 1, wherein the stored software further comprises instructions for baselining the table to obtain storage information comprising information reflecting a block count, number of rows, and number of chained/migrated rows in the table.

5. The computer-readable storage medium of claim 1, wherein the stored software further comprises instructions for:
   using a function native to the database to baseline the database;
   using an initial routine to make the entries into the transaction log; and
   using a monitoring routine to retrieve the storage information from the transaction log and to periodically update the storage information.

6. The computer-readable storage medium of claim 1, wherein the stored software further comprises instructions for repeatedly baselining the table and making entries into the transaction log as specified by a user.

7. A method for obtaining and maintaining storage information related to storage characteristics of a table in a database, comprising:
   locking a particular table to be baselined;
   baselining the table contained in the database, wherein said storage information is obtained;
   unlocking the table after it is baselined;
   making an entry into a transaction log, wherein the entry contains the storage information;
   retrieving the storage information from the transaction log;
   periodically updating the storage information by monitoring subsequent entries in the transaction log, comprising steps of adding row identifications to the storage information when a first particular entry in the transaction log indicates a new chained row, and removing row identifications from the storage information when a second particular entry indicates a changed row has been removed;
   sending the storage information to a requesting entity, wherein a portion of the storage information is row identifications; and
   deleting the row identifications, wherein the requesting entity maintains the row identifications.

8. A computer system, containing a database, that executes a database system program for managing data contained in the database, and a storage information program that computes and monitors storage information for the database, comprising:
   a processor; and
   memory units, electrically connected to the processor, wherein the database system program directs the processor to retrieve portions of the database from the memory units for manipulation by the processor, and the storage information program directs the computer system to operate in a mode of operation to compute and monitor the storage information, wherein
   a table contained in the database is locked, thereby preventing modifications of the table;
   an entry into the transaction log that the table is to be baselined is made;
   the table is baselined by the database system program, wherein storage information is obtained;
   the table is unlocked, wherein access to the table is restored;
   a storage area to receive the storage information for the table is prepared;
   an entry into a transaction log is made, wherein the entry contains the storage information;
   a monitoring routine retrieves the storage information from the transaction log and periodically updates the storage information by monitoring subsequent entries in the transaction log, comprising adding row identifications by the monitoring routine to the storage information when a first particular entry in the transaction log indicates a new chained row has been created and removing row identifications from the storage information when a second particular entry indicates a changed row has been removed;
   the storage information is sent to a requesting entity, wherein a portion of the storage information is row identifications; and
   the row identifications are deleted, wherein the requesting entity maintains the row identifications.

9. A computer-readable storage medium storing software executable by a computer system and designed to obtain and maintain storage information related to storage characteristics of a table in a database, the software comprising instructions for:
   locking a table, thereby preventing modifications of the table;
   making a first entry into a transaction log that the table is to be baselined;
   baselining the table, wherein the storage information is obtained;
   unlocking the table after it is baselined, wherein access to the table is restored;
   preparing a storage area to receive the storage information for the table;
   making a second entry into the transaction log, wherein the second entry contains the storage information;
   retrieving the storage information from the transaction log;
   periodically updating the storage information by monitoring subsequent entries in the transaction log, comprising adding row identifications to the storage information when a third entry in the transaction log indicates a new chained row, and removing row identifications from the storage information when a fourth entry indicates a chained row has been removed;
   sending the storage information to a requesting entity, wherein a portion of the storage information is row identifications; and
   deleting the row identifications, wherein the requesting entity maintains the row identifications.

* * * * *